Sept. 15, 1925.　　　　　　　　　　　　　　　　　　1,554,170
L. J. DAVIS
CAR SEAT CONSTRUCTION
Filed Feb. 13, 1924　　　5 Sheets-Sheet 3
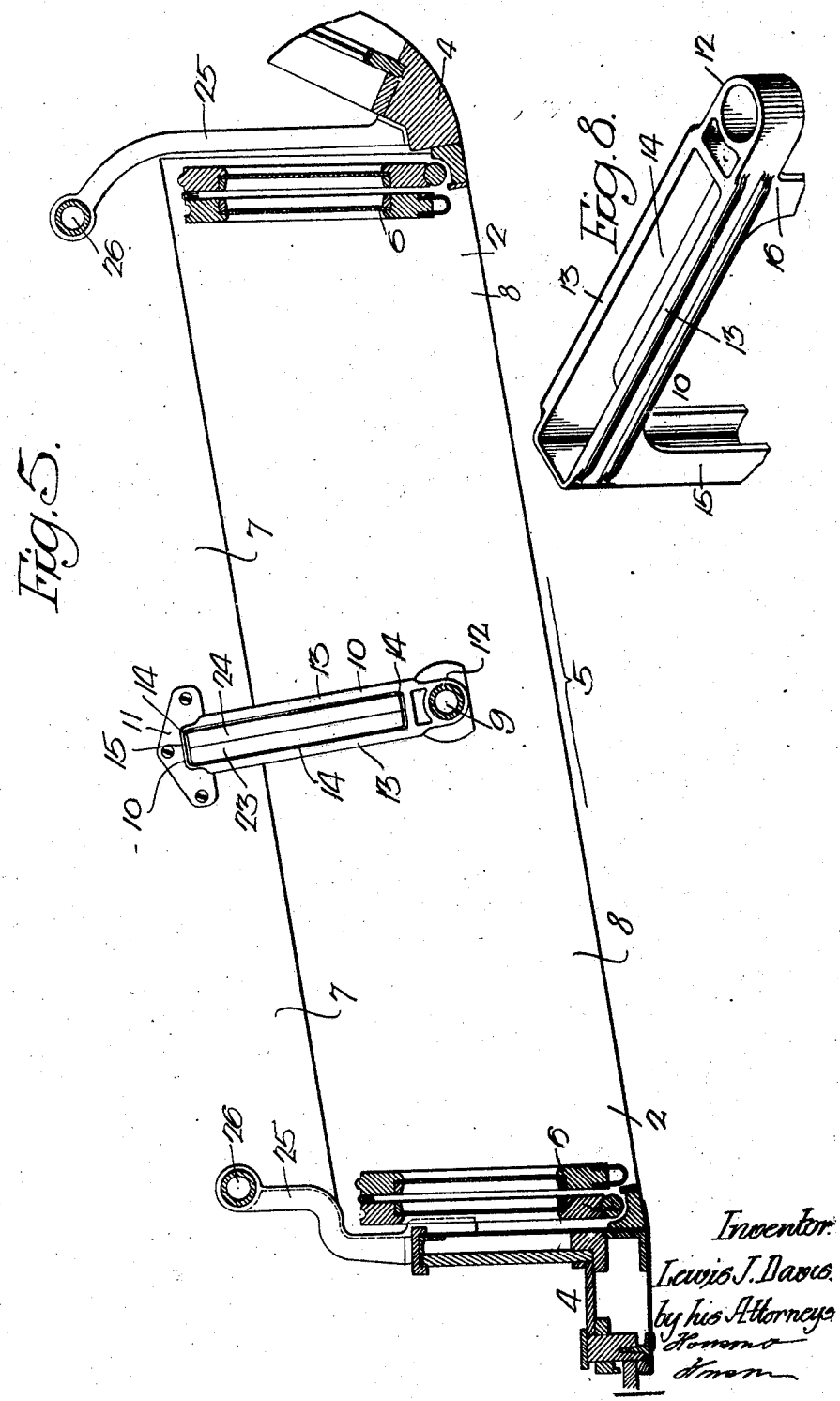
Inventor
Lewis J. Davis.
by his Attorneys

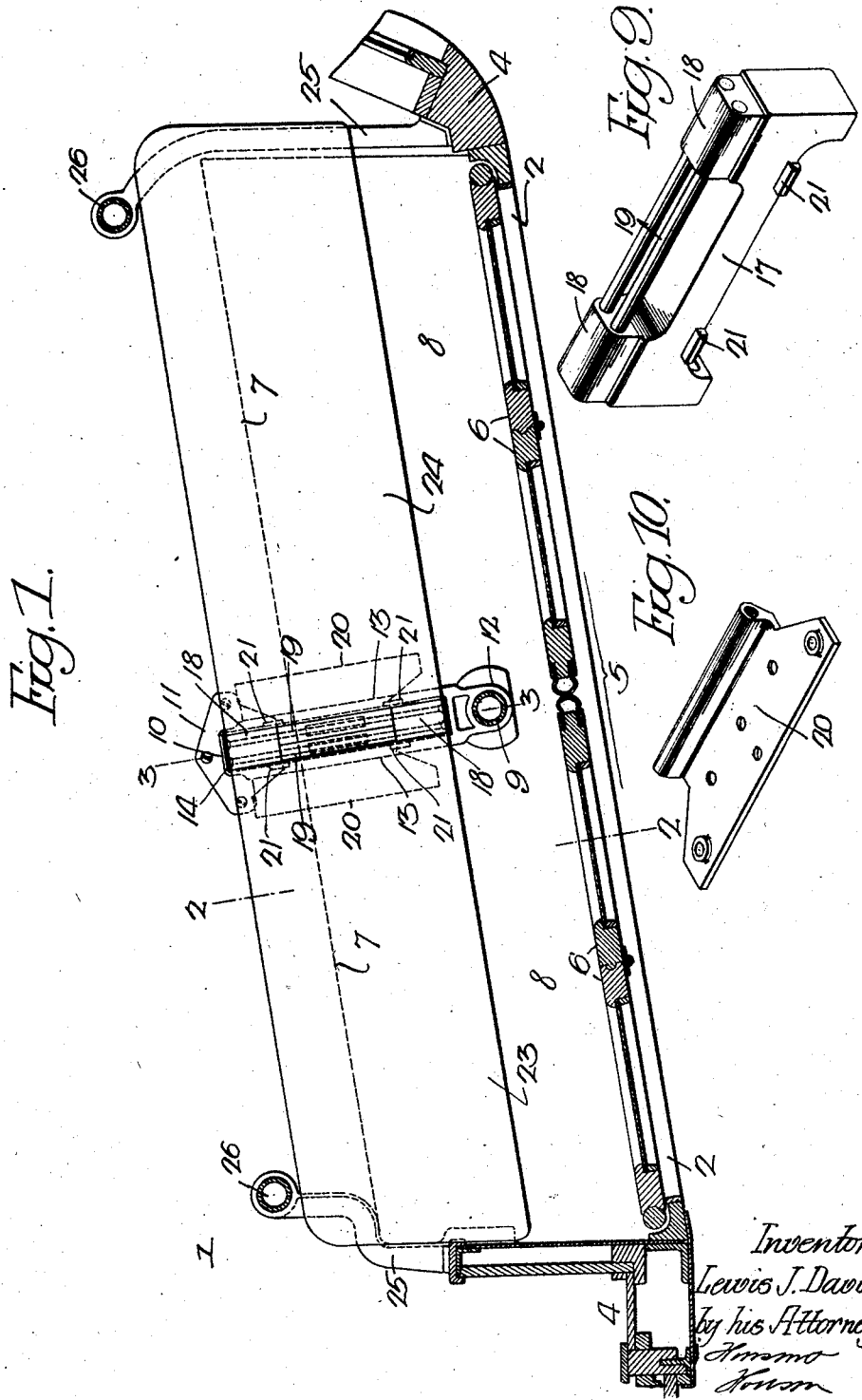

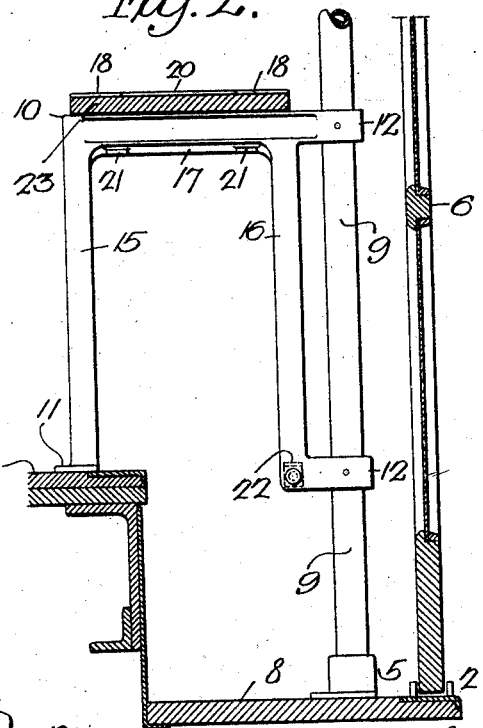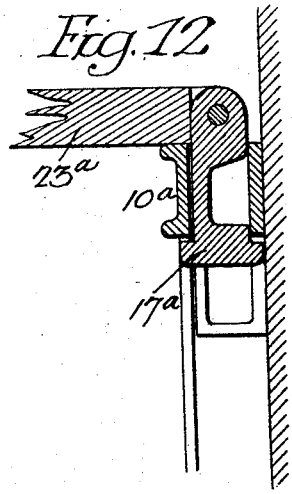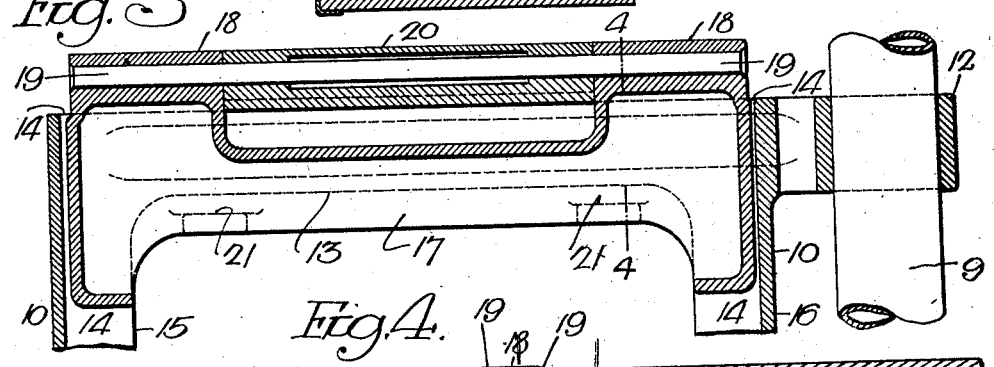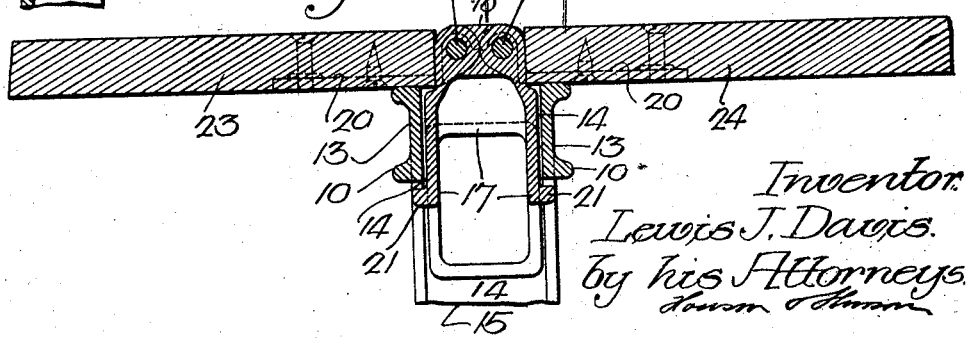

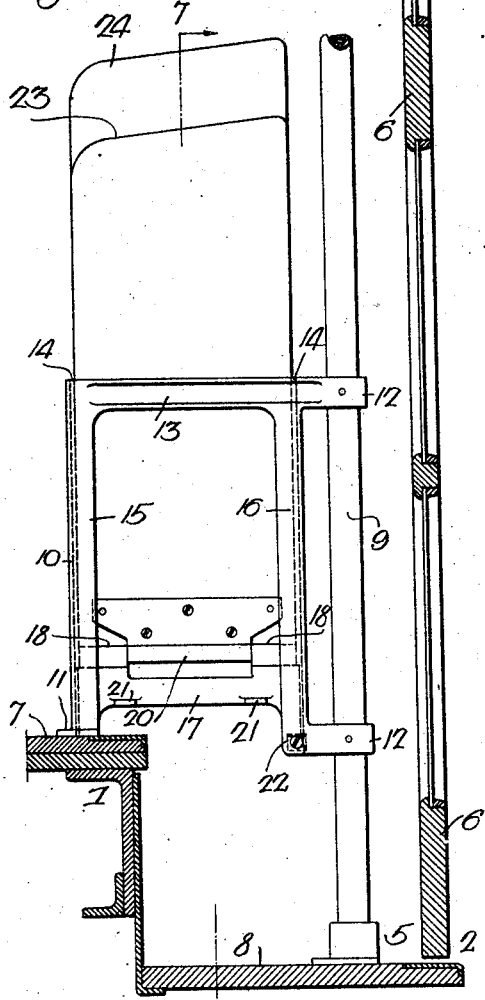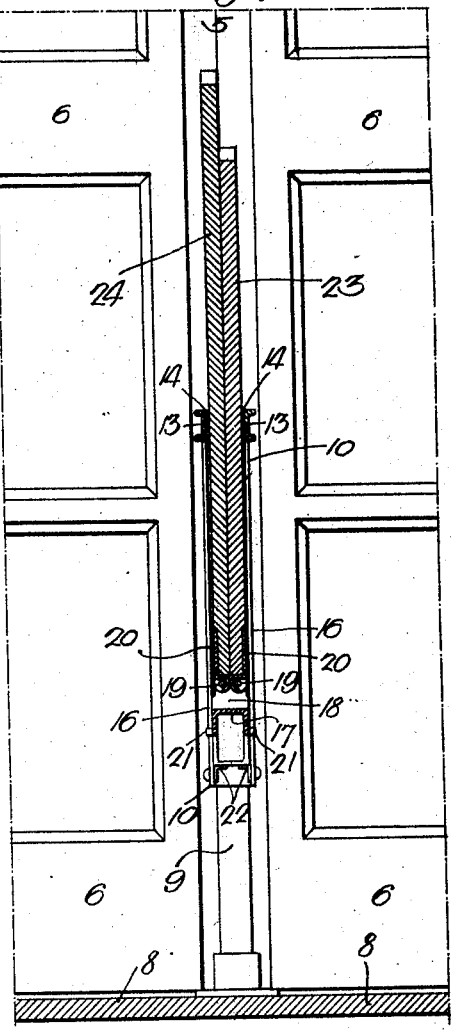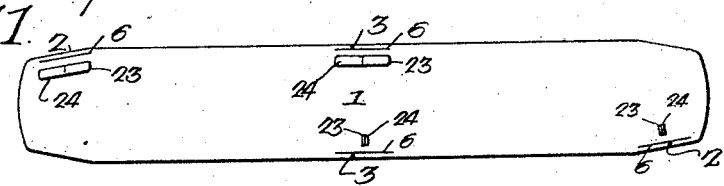

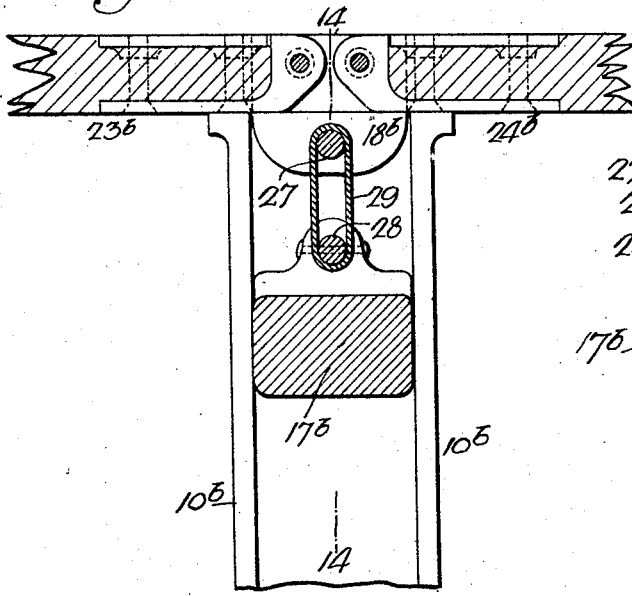
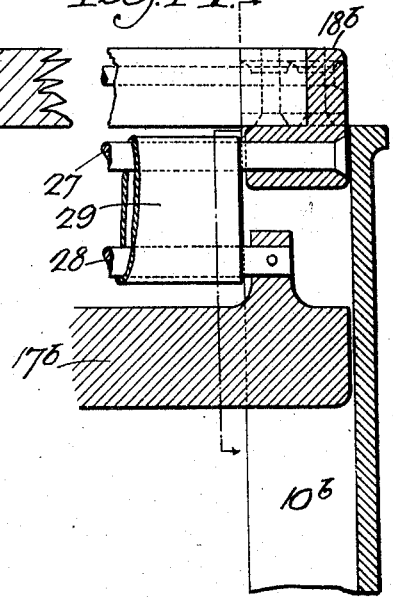
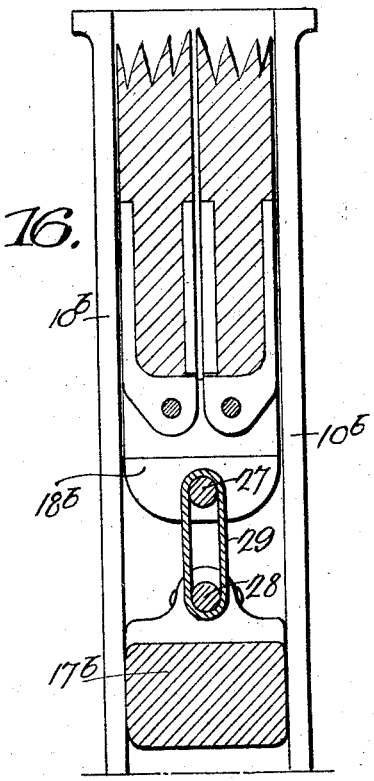
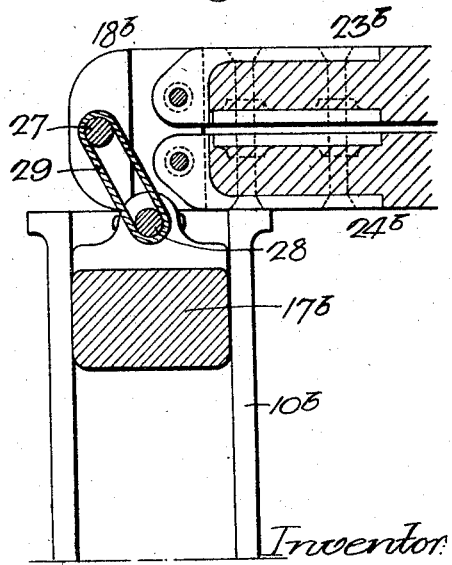

Patented Sept. 15, 1925.

1,554,170

UNITED STATES PATENT OFFICE.

LEWIS J. DAVIS, OF BROOKLYN, NEW YORK.

CAR-SEAT CONSTRUCTION.

Application filed February 13, 1924. Serial No. 692,542.

*To all whom it may concern:*

Be it known that I, LEWIS J. DAVIS, a citizen of the United States, residing in Brooklyn, New York, have invented certain Improvements in Car-Seat Construction, of which the following is a specification.

One object of my invention is to provide a collapsible structure that can be moved into a horizontal position or into a vertical position.

A further object of the invention is to provide a collapsible seat for the doorway of a passenger car so that, when the doorway is in use, the seat can be turned to a vertical position, forming a hand rail, and, in some instances, a partition. When the doorway is not in use, the seat can be turned into a horizontal position across the doorway, affording additional seating capacity for passengers.

While the invention is particularly a movable seat for passenger cars, it can be used in any place where a temporary seat is desired. In some instances, it can be used as a table, or other movable structure.

In the accompanying drawings:

Fig. 1 is a sectional plan view of a portion of a passenger car, showing the doors closed and the seat structure turned down;

Fig. 2 is a vertical sectional view on the line 2—2 of Fig. 1;

Fig. 3 is an enlarged sectional view on the line 3—3 of Fig. 1;

Fig. 4 is a sectional view on the line 4—4, Fig. 3;

Fig. 5 is a sectional plan view of a portion of a car, similar to Fig. 1, with the seat structure raised and the doors in the open position;

Fig. 6 is a vertical sectional view, similar to Fig. 2, with the seat raised, forming a low partition and hand rail between the passageways;

Fig. 7 is a sectional view on the line 7—7, Fig. 6;

Fig. 8 is a detached perspective view of the upper portion of the seat guide;

Fig. 9 is a detached perspective view of the carrier for the seat;

Fig. 10 is a detached perspective view of the seat hinges;

Fig. 11 is a diagram of a trolley car, showing the location of my improved seat structures at the doorways of the car;

Fig. 12 is a sectional view illustrating a single seat structure;

Fig. 13 is a view illustrating a modified form of seat structure, showing the seat structure turned down;

Fig. 14 is a sectional view on the line 14—14, Fig. 13;

Fig. 15 is a view, similar to Fig. 13, with one seat turned over the other seat; and Fig. 16 is a view showing the seats in a vertical position.

Referring to Fig. 11, 1 is a passenger car of the power driven type used on street railways. This car has a doorway 2 at each end and a doorway 3 at each side, at the center. When the car is in service, the two doorways on one side of the car are in use, and the doors of the other doorways, at the opposite side of the car, are closed. My improved seat structure is so designed that it can be raised and folded to form a low partition and hand rail at a doorway, when said doorway is in use. It can also be turned down to form a seat across the doorway, when the doorway is not in use.

The frame of the car is shown at 4. 5 designates a doorway. 6, 6 designates pivoted doors, which can be opened and closed by the motorman, or by the conductor. 7 designates the floor of the car, and 8 designates a step at the doorway. 9 designates a dividing post that extends from the step to the top of the doorway.

A seat guide 10 has a foot 11, which is secured to the floor of the car. It also has collars 12 through which the post 9 extends. These collars are secured to the post by pins, or other fastenings. The guide has two horizontal rails 13 that are spaced apart to form a channel 14. This channel extends in the form of a groove in the side members 15 and 16 of the guide, Fig. 8. Arranged to slide in the guide is a seat carrier 17, Fig. 9. This carrier has projections 18, which form bearings for the two hinge pintles 19, on which the seat hinges 20 are mounted so that the seats can be turned on the pintles to a horizontal position, as shown in Fig. 1, or to a vertical position, as shown in Figs. 5 and 7. Stop lugs 21, on the carrier, limit the upward movement of the carrier. When the seats are in a vertical position, the carriers rest on the floor and on lugs 22, Figs. 6 and 7.

23 and 24 designate the seats to which are secured the hinges 20. It is preferable to make these seats of wood, or other suitable material, and of a thickness to slide in the channel 14, when they are folded. When the seats are opened and are turned down, they rest on the top rails 13 of the guide and on bars 25 at each side of the doorway. Each of these bars is attached to the frame of the car and to a post 26, as shown in Figs. 1 and 5. The seat guide is located at the center of the doorway 5 and forms—with the post 9—the dividing frame. When the seats are raised, they act, with the frame, as a partition between the two passageways and also form a hand rail.

It will be seen that when the seats are in a horizontal position, the hinge section is flush with the surface of the seats, consequently, the entire seat structure can be occupied. The parts are so arranged that the slide cannot be raised to such a distance above the guide to cause the end of the seats to slip off of the end supports.

In Fig. 12, the invention is illustrated in the form of a single seat structure. $23^a$ designates the seat, which is pivoted to the seat carrier $17^a$, and is arranged to slide in the guide $10^a$. This structure can be placed at the side of a doorway, or against a wall, if desired.

In Figs. 13 to 16, inclusive, the hinge arrangement is so modified that one seat can be turned upon the other seat, when it is desired to use only one door of a double doorway. $23^b$ and $24^b$ designate the two seats, which are pivotally connected to hinge blocks $18^b$. These blocks are designed to slide in the guides $10^b$. Connecting the blocks is a rod 27. The carrier $17^b$ is arranged to slide in the guide $10^b$ and has a rod 28, which is parallel with the rod 27. 29 designates a strap that encircles the two rods and connecting the blocks $18^b$ with the carrier $17^b$ so that the blocks can ride out of the slot of the guide and turn from the position shown in Fig. 13 to that shown in Fig. 15, when it is desired to turn one seat over upon the other seat. When the seats are folded, both blocks are free to slide in the guides, as in Fig. 16.

I claim:

1. The combination in a passenger seat for railway cars, of a vertically arranged guide mounted on the floor of the car; a carrier arranged to slide in the guide; and a member adapted to the carrier and arranged to assume a horizontal position when the carrier is elevated and to assume a vertical position when the carrier is lowered.

2. The combination in a passenger seat for railway cars, of a vertically arranged guide mounted on the body of the car; a carrier arranged to slide vertically in the guide; and two seat members pivotally connected to the carrier and arranged to assume a horizontal position on each side of the guide, or to assume a vertical position within the guide.

3. The combination in a passenger seat for railway cars, of a guide mounted on the floor of the car; a carrier arranged to slide in the guide; and a seat pivoted to the guide so that, when the carrier is raised, the seat assumes a horizontal position, and, when the carrier is lowered, the seat assumes a vertical position.

4. The combination of a car frame having a doorway; a guide at the doorway forming a dividing frame; a carrier arranged to slide vertically in the guide; and a seat pivoted to the carrier.

5. The combination of a car frame having a doorway; a guide at the doorway; a carrier arranged to slide vertically in the guide; and a seat pivoted to the carrier and arranged to be supported by the guide in a vertical position or in a horizontal position.

6. The combination in a passenger seat for railway cars, of a car body; a guide mounted on the floor of the car at a doorway, said guide having spaced side rails and a vertical channel; a carrier arranged to slide in the channel, said carrier having two hinge pintles; and two seats mounted on the pintles, said rails of the guide acting as supports for the hinge ends of the seats when the seats are in a horizontal position.

7. The combination of a car frame having a doorway; doors closing the doorway; a vertical dividing post at, or near, the center of the doorway; a guide extending from the post to the floor of the car; a carrier arranged to slide in the guide; two seats pivoted to the carrier; and supports at the sides of the doorway on which the outer ends of the seats rest when they are in a horizontal position.

8. The combination in a passenger seat for railway cars, of a car frame having a doorway; a seat structure at the doorway consisting of a vertical guide; a slide adapted to the guide; two seat sections connected to the slide and arranged so that they can be folded in a vertical position, or raised to assume a horizontal position end for end, or one above the other; and means for supporting the outer ends of the seat sections.

9. The combination of a car having a doorway; a guide at the doorway having vertical guideways; a slide adapted to the guideways; a seat section pivoted to the slide; stops to limit the movement of the slide; and means for supporting the other end of the seat section.

LEWIS J. DAVIS.